United States Patent [19]
De La Bourdonnaye

[11] Patent Number: 5,420,861
[45] Date of Patent: May 30, 1995

[54] MULTIPLEX SYSTEM FOR SUB-CHANNELS WHICH HAVE VARIOUS PRIORITY LEVELS

[75] Inventor: Philippe De La Bourdonnaye, Paris, France

[73] Assignee: U.S. Philips Corporation, New York, N.Y.

[21] Appl. No.: 240,951

[22] Filed: May 10, 1994

Related U.S. Application Data

[63] Continuation of Ser. No. 904,772, Jun. 26, 1992, abandoned.

[30] Foreign Application Priority Data

Jun. 28, 1991 [FR] France ................ 91 08063

[51] Int. Cl.$^6$ .......................................... H04J 3/22
[52] U.S. Cl. ........................................ 370/84; 370/112
[58] Field of Search ............... 370/85.6, 85.7, 110.1, 370/110.4, 95.1, 84, 16, 112, 11; 455/58.1

[56] References Cited

U.S. PATENT DOCUMENTS

| | | | |
|---|---|---|---|
| 4,707,853 | 11/1987 | Hasegawa | 340/825.51 |
| 4,716,407 | 12/1987 | Borras et al. | 340/825.51 |
| 4,899,337 | 2/1990 | Hirar | 370/80 |
| 5,014,264 | 5/1991 | Nagler et al. | 370/58.1 |
| 5,132,966 | 7/1992 | Hayano et al. | 370/85.6 |
| 5,195,089 | 3/1993 | Sindhu et al. | 370/85.6 |
| 5,212,687 | 5/1993 | De La Bourdonnaye | 370/84 |

OTHER PUBLICATIONS

International Technology Disclosure TP 119002, Nov. 25, 1990, "Priority and Bandwidth Optimization Preemption Feature and Algorithm".

Primary Examiner—Douglas W. Olms
Assistant Examiner—Ajit Patel
Attorney, Agent, or Firm—Leroy Eason

[57] ABSTRACT

A multiplex system having a main transmission channel (MC) for transmitting or not, within a pass-band corresponding to the information rate, information signals coming from a plurality of sub-channels in accordance with the priority levels of the sub-channels. A priority level having overflow authorization is assigned to certain of the sub-channels, an overflow transmission channel (OC) being provided for transmission by sub-channels having overflow authorization when the main channel (MC) is saturated.

2 Claims, 2 Drawing Sheets

MULTIPLEX SYSTEM FOR SUB-CHANNELS WHICH HAVE VARIOUS PRIORITY LEVELS

This is a continuation of application Ser. No. 07/904,772, filed Jun. 26, 1992, abandoned.

BACKGROUND OF THE INVENTION

1. Field of the Invention

The present invention relates to a multiplex system for sub-channels which have various priority levels, the multiplex system utilizing a first main transmission channel for transmitting or not transmitting the information signals coming from said sub-channels depending on the priority levels of the sub-channels.

This type of system is applicable to data transmissions which use a main transmission channel of the type defined by Recommendation X28 of the CCITT.

2. Description of the Related Art

For a better utilization of the multiplex system, priority levels are assigned to the sub-channels to be multiplexed so that a sub-channel having a high priority may force itself onto the main transmission channel and interrupt the traffic of the sub-channels having a lower priority. In that regard, the reader may be referred to the publication "TP-119002" (INTERNATIONAL TECHNOLOGY DISCLOSURE of the American Government), 25 Nov. 1990.

A problem which may arise with this type of system is the question of accessibility by transmission for a sub-channel that has a priority level comparable to those already occupying the whole, main transmission channel.

SUMMARY OF THE INVENTION

In order to specifically resolve this problem, the present invention proposes a system of the type mentioned in the opening paragraph which is characterized in that above a certain priority level overflow authorization is assigned to specific sub-channels. A second main transmission channel, termed overflow the "overflow channel" is provided for transmitting the information signals of the sub-channels having overflow authorization when the first main channel is saturated.

BRIEF DESCRIPTION OF THE DRAWINGS

The following description accompanied by appended drawings, all given as a non-limiting example, will make it better understood how the invention may be realised. In the drawings.

DESCRIPTION OF THE PREFERRED EMBODIMENTS

Figure 1:
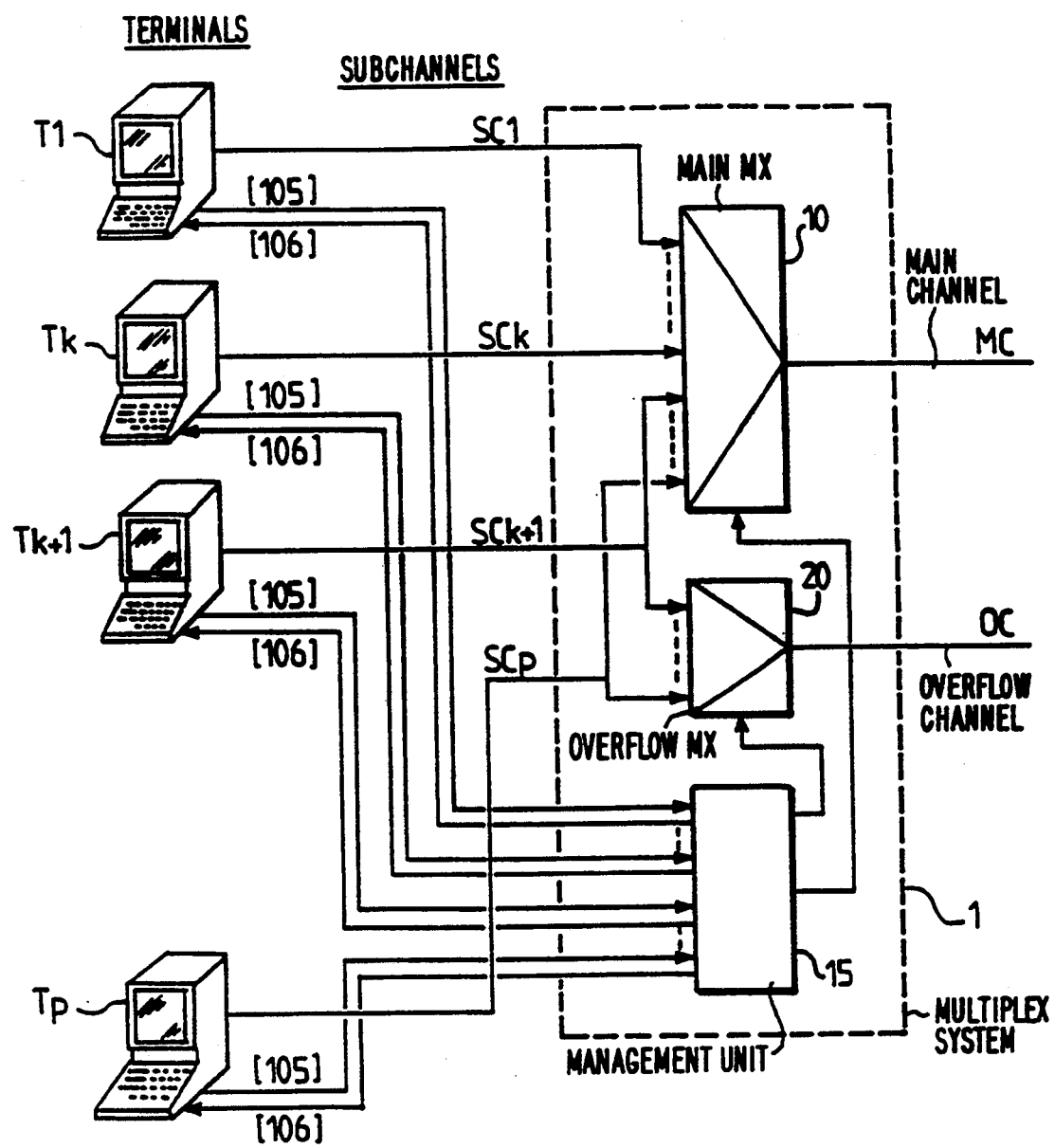
FIG. 1 represents a diagram of a multiplex system according to the invention.

In the multiplex system 1 shown in FIG. 1 it is possible to connect a plurality of terminals T1, T2, ..., Tp to a main transmission channel MC. The links between said terminals and the system 1 are realised by means of sub-channels SC1, SC2, ..., SCp. Various priority levels are assigned to these sub-channels; thus, certain sub-channels have the lowest priority level and are qualified as normal sub-channels, and other sub-channels have higher priority levels. A main multiplex unit 10 makes it possible for these sub-channels to access a main transmission channel MC under the control of a management unit 15. These different sub-channels SC1, ..., SCp can transmit information signals at various rates and may thus need large or less large pass-bands; the multiplexing on the MC channel is to be arranged for transmitting these information signals at various appropriate rates. On this subject see French Patent Application No. 9015691, filed 14 Dec. 1990 in the name of Applicants.

As, in principle, the transmission pass-band represented by the MC channel is smaller than the sum of the pass-bands of the various sub-channels, the access of these sub-channels to the MC channel must be regulated. For example, it is possible to give access to a priority sub-channel and deny access a number of the normal channels, such number being a function of the pass-band required by the priority sub-channel.

According to the invention an additional priority level is assigned which is an authorization to use an overflow channel OC. Thus the sub-channels SCk+1, ..., SCp may be connected to this OC channel by means of a second overflow multiplex unit 20 itself controlled by the management unit 15.

Figure 2:
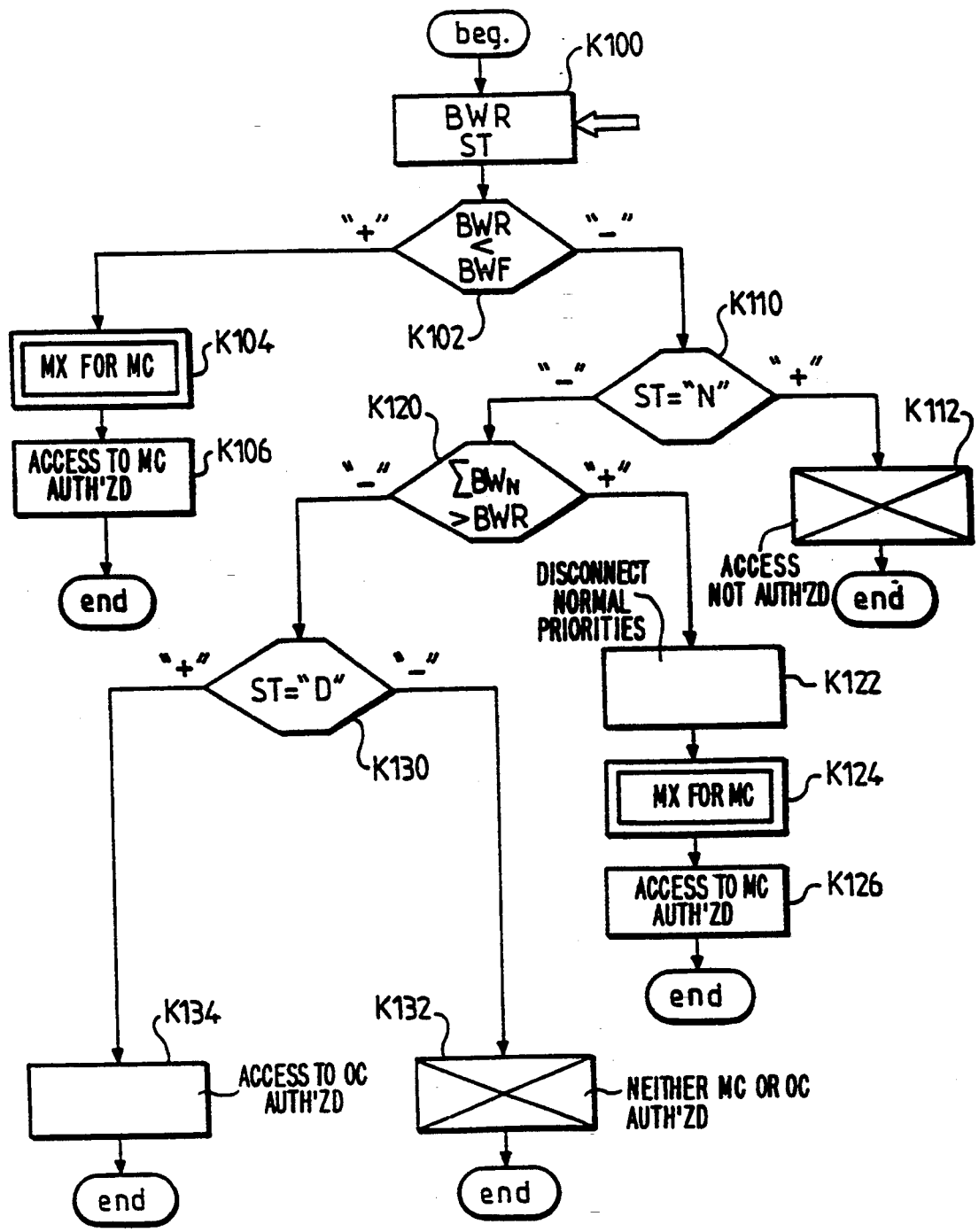
FIG. 2 is a flow chart to explain the operation of the system represented in FIG. 1.

The flow chart shown in FIG. 2 explains in detail the operation of management unit 15. A handshake between such unit and the terminals is provided by a set of; circuits [105] and [106] shown only by identification in FIG. 1. A request for access passes through circuit [105] and the authorization giving access passes through circuit [106]. The design of these circuits is given in Recommendation V24 of the CCITT.

In FIG. 2 box K100 indicates a request for access from a sub-channel, the terminal sends a signal to the circuit [105], which requests a certain pass-band BWR and gives its priority level ST. The following priority levels are possible:

ST can be equal to "N", denoting a normal sub-channel to which the lowest priority has been assigned, ST can be equal to "D", which gives access to overflow channel if necessary, and is the highest priority level, ST is not equal to either "D" or "N"; this denotes a priority sub-channel on normal channels, without having a right of access to the overflow channel.

In box K102 there is verified whether the pass-band DWR is smaller than the available pass-band BWF; if so, the branch "+"; is taken and box K104 is proceeded to where the multiplex transmitted by the MC channel is rearranged, in conformity with the method described in afore-mentioned Patent Application. Subsequently, the box K106 indicates the operation according to which access is finally authorized and a signal is sent to the circuit [106].

If the verification indicated in box K102 is negative, box K110 is proceeded to where the priority level of the requesting sub-channel is examined. If a normal sub-channel is concerned (ST="N"), the sub-channel is not permitted to connect to the main channel MC, which is indicated in box K112. No transmission takes place to the circuit [106].

If the verification in the box K110 is negative, then a priority channel is concerned. Subsequently, in box K120 the total pass-band occupied by the normal sub-channels is verified; if this is larger than the one required by the requesting sub-channel, a disconnecting procedure, of the normal sub-channels is started in box K122. This procedure may consist of disconnecting the sub-channels while simply taking their identification codes into consideration. For example, if this code is an alphabetical code, the disconnection may be effected in an alphabetical order, so that only the necessary passband is obtained. Box K124 denotes the rearrangement of the multiplex and box K126 the access authorization everything as shown in above boxes K104 and K106.

If the verification denoted in box K120 is negative, box K130 is proceeded to, where it is verified whether it is a sub-channel for which an overflow access is permitted or not. If not, this sub-channel is neither authorized to be connected to the MC channel, nor to use the overflow channel (box K132). If it is a matter of a priority channel having authorization to use the overflow channel, then this connection is authorized by the procedure indicated in box K134.

I claim:

1. A multiplex transmission system having a main transmission channel, an overflow transmission channel, and a plurality of sub-channels having various relative priorities; sub-channels which have priorities above a predetermined priority level being high priority sub-channels, access to said overflow transmission channel being authorized only for certain of said high priority sub-channels; the priority of a sub-channel and whether it has overflow authorization being signified by a priority identification code signal which is transmitted therein when a sub-channel requests access to a transmission channel; characterized in that said system comprises:

a main multiplexing unit coupled to all of said sub-channels for providing multiplexed access to said main transmission channel for a plurality of sub-channels;

an overflow multiplexing unit coupled to those of said high priority sub-channels which have overflow authorization for providing multiplexed access to said overflow transmission channel for a plurality of high priority sub-channels which have overflow authorization; and a management unit coupled to all of said sub-channels and which, in response to priority identification code signals from a plurality of sub-channels concurrently requesting access to a transmission channel, is adapted to:
   i. control said main multiplexing unit to provide access to the main transmission channel for up to a first limited number of requesting sub-channels in accordance with their relative priorities; and
   ii. control said overflow multiplexing unit to provide access to the overflow transmission channel for up to a second limited number of requesting high priority sub-channels which have overflow authorization but do not qualify for access to the main transmission channel.

2. A multiplex transmission system as claimed in claim 1, wherein said management unit is adapted to control the main multiplexing unit to provide a requesting sub-channel with access to the main transmission channel by disconnecting a number of sub-channels which are already connected to the main transmission channel and which are of lower priorities than the requesting sub-channel, said disconnection being performed in descending order of priorities of the already connected sub-channels until the number of disconnected sub-channels corresponds to a pass-band signified by the identification code signal transmitted by the requesting sub-channel.

* * * * *